US009195573B1

(12) United States Patent
Giammaria et al.

(10) Patent No.: US 9,195,573 B1
(45) Date of Patent: Nov. 24, 2015

(54) REMEDIATION OF KNOWN DEFECTS AND VULNERABILITIES IN CLOUD APPLICATION PACKAGES

(71) Applicant: International Business Machines Corporation, Armonk, NY (US)

(72) Inventors: Alberto Giammaria, Austin, TX (US); Christopher Andrew Peters, Round Rock, TX (US); Thomas Spatzier, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/300,364

(22) Filed: Jun. 10, 2014

(51) Int. Cl.
*G06F 9/44* (2006.01)
*G06F 11/36* (2006.01)
*H04L 29/08* (2006.01)

(52) U.S. Cl.
CPC .............. *G06F 11/3688* (2013.01); *G06F 8/71* (2013.01); *H04L 67/1095* (2013.01)

(58) Field of Classification Search
CPC ... G06F 11/3688; G06F 8/71; G06F 11/3466; H04L 67/1095
USPC ................................................. 717/124–128
See application file for complete search history.

(56) References Cited

U.S. PATENT DOCUMENTS

| 7,827,533 | B2* | 11/2010 | Miyao et al. ................... 717/126 |
| 2002/0156863 | A1* | 10/2002 | Peng ............................ 709/217 |
| 2005/0015752 | A1* | 1/2005 | Alpern et al. ................. 717/131 |
| 2005/0044233 | A1* | 2/2005 | Cai et al. ...................... 709/227 |
| 2007/0074149 | A1* | 3/2007 | Ognev et al. .................. 717/101 |
| 2008/0016398 | A1* | 1/2008 | Jesudoss et al. ................ 714/37 |
| 2008/0120400 | A1* | 5/2008 | Keller et al. .................. 709/223 |
| 2011/0289588 | A1 | 11/2011 | Sahai et al. |

(Continued)

FOREIGN PATENT DOCUMENTS

| CN | 102750602 | 10/2012 |
| CN | 202524424 | 11/2012 |
| WO | WO2012019314 | 12/2012 |

OTHER PUBLICATIONS

Juhnke et al, "Fault-tolerant BPEL workflow execution via cloud-aware recovery policies," Software Engineering and Advanced Applications, IEEE, 2009.

(Continued)

*Primary Examiner* — Anna Deng
(74) *Attorney, Agent, or Firm* — Jeffrey S. LaBaw; David H. Judson

(57) ABSTRACT

A method for applying remediation policy to a cloud application package having a set of components is described. The method is initiated in response to discovery of a new vulnerability. It begins by comparing information from a deployment description against a data set of known problems associated with the one or more of the components. The deployment description represents the set of components and their interrelationships. For each of the one or more components, one or more known problems that satisfy a given severity and/or complexity criteria are identified. Thereafter, and with respect to at least one of the components for which one known problem satisfying the given criteria has been identified, the remediation policy (e.g., an update, a replacement, a patch, an additional installable) is applied to attempt to rectify the known problem. After applying the policy, the old version of the package is replaced with the new version.

13 Claims, 10 Drawing Sheets

(56) References Cited

U.S. PATENT DOCUMENTS

| | | |
|---|---|---|
| 2012/0131677 A1 | 5/2012 | Chakra et al. |
| 2012/0266158 A1 | 10/2012 | Spivak et al. |
| 2012/0311659 A1 | 12/2012 | Narain et al. |
| 2013/0019314 A1 | 1/2013 | Ji et al. |
| 2013/0031037 A1* | 1/2013 | Brandt et al. .................. 706/12 |

OTHER PUBLICATIONS

Chen et al, "CloudER: a framework for automatic software vulnerability location and patching in the cloud," Proceedings of the 7th ACM Symposium on Information, Computer and Communications Security, ACM 2012.

* cited by examiner

```
<ServiceTemplate>
  <TopologyTemplate>
    ...
    <NodeTemplate id="ApacheWebServer" type="ns:ApacheWebServer">
      ...
    </NodeTemplate>
    ...
  </TopologyTemplate>
</ServiceTemplate>
```

```xml
<NodeType name="ApacheWebServer">
    ...
</NodeType>
<NodeTypeImplementation name="ApacheWebServerImpl">
    <SoftwareID>cpe://a:apache:http_server:2.4.1</SoftwareID>
    <DeploymentArtifact artifactRef="ns:ApacheInstallable"
artifactType="tosca:ArchiveArtifact" ... >
        ...
    </DeploymentArtifact>
    ...
    <ImplementationArtifact artifactRef="ns:ApacheInstallScript"
artifactType="tosca:ScriptArtifact"
        operationName="install" ... />
    ...
</NodeTypeImplementation>

<ArtifactTemplate id="ApacheInstallable" type="tosca:ArchiveArtifact">
    ...
    <ArtifactReferences>
        <ArtifactReference reference="files/Apache-2.4.1.tgz"/>
    </ArtifactReferences>
</ArtifactTemplate>

<ArtifactTemplate id="ApacheInstallScript" type="tosca:ScriptArtifact">
    ...
    <ArtifactReferences>
        <ArtifactReference reference="scripts/ApacheWebServer/install.sh"/>
    </ArtifactReferences>
</ArtifactTemplate>
```

FIG. 10

| 1 | COMPONENT NAME | PROBLEM ID | PROBLEM DESCRIPTION | SEVERITY | COMPLEXITY |
|---|---|---|---|---|---|
| 2 | APACHE WEB SERVER | 2082AB | LOCAL USER CAN GAIN PRIVILEGES ... | 1 | 1 |
| 3 | APACHE WEB SERVER | 8039FC | ALLOW UNTRUSTED UPLOADS ... | 1 | 2 |
| 4 | APACHE WEB SERVER | 6984DF | mod_proxy_ajp CAN CONNECT... | 3 | 3 |
| 5 | ... | | | | |
| 6 | MYSQL SERVER | 6840HG | PERFORMANCE DEGRADATION ON... | 2 | 1 |
| 7 | MYSQL SERVER | 6940DD | CRASH ON WINDOWS WHEN ... | 1 | 2 |
| 8 | MYSQL SERVER | 7956AF | REMOTE USER CAN GAIN PRIVILEGES | 1 | 3 |
| 9 | ... | | | | |

REMEDIATION OF KNOWN DEFECTS AND VULNERABILITIES IN CLOUD APPLICATION PACKAGES

BACKGROUND OF THE INVENTION

1. Technical Field

This disclosure relates generally to deploying applications in a "cloud" compute environment.

2. Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

It is known in the art to provide appliance-based or platform-based solutions to facilitate rapid adoption and deployment of cloud-based offerings. Typically, a cloud-based offering is deployed as a cloud application package. One such appliance that may be used for this purpose is IBM® Workload Deployer, which is based on the IBM DataPower® 7199/9005 product family. Typically, the appliance is positioned directly between the business workloads that many organizations use and the underlying cloud infrastructure and platform components. Alternatively, cloud application packages may be deployed using platform-as-a-service (PAS) infrastructure, such as the IBM® SmartCloud® Orchestrator open cloud management platform. A management platform of this type typically comprises several layers including an infrastructure services layer for provisioning, configuring and managing storage, compute and network resources, a platform services layer, and an orchestration services layer to provide business process management. The platform services layer includes virtual machine image lifecycle management capabilities and pattern services, wherein a "pattern" provides deployment and management instructions for the business service. A pattern preferably is an XML-based definition of an infrastructure configuration required to provision and managed the various resources (e.g., compute, networking, storage, OS, middleware, and the like) for a specific application (or application-type) workload.

Software is never 100% safe, as new defects and vulnerabilities are discovered every day. Cloud application packages are no different; indeed, often just a few days after an application package has been published into the cloud, it may already contain new vulnerabilities. While current deployment solutions provide numerous advantages, there remains a need to address the problem of deploying applications that can be exploited by later-discovered or post-deployment vulnerabilities or other defects.

BRIEF SUMMARY

According to this disclosure, a cloud deployment system (e.g., an appliance, a cloud management platform, or other such mechanism) is enhanced by providing for identification and remediation of defects and vulnerabilities in cloud application packages, preferably as such application packages are being deployed in the cloud environment. The approach enables known defects or vulnerabilities in cloud application packages to be addressed (e.g., by removal, updating, patching) proactively and in an automated manner prior to or upon deployment. With this approach, administrators can be more confident that the cloud application they are about to deploy does not contain known vulnerabilities for which a patch already exists.

According to one embodiment, a method for applying a remediation policy to a cloud application having a set of components is described. An objective is for an enterprise to have a catalog of cloud applications packages clean of any known vulnerability. In this embodiment, the method is initiated in response to a discovery of a new vulnerability. It begins by comparing information from a deployment description against a data set of known problems associated with the one or more of the components. The deployment description represents the set of components and their interrelationships. A representative deployment description is a TOSCA (Topology and Orchestration Specification for Cloud Applications)-compliant document. Then, for each of the one or more components, one or more known problems that satisfy a given criteria are then identified. The given criteria may be one of: complexity criteria, severity criteria, and a combination of the complexity and severity criteria. Thereafter, and with respect to at least one of the components for which at least one known problem satisfying the given criteria has been identified, the remediation policy is applied to attempt to rectify the known problem. The remediation policy typically is one of: an update, a replacement, a patch, an additional installable, or the like. If the remediation policy is not available, the cloud application package may be removed from the catalog, e.g., until a fix is developed. After applying the remediation policy, the old version of the package is replaced with the new version. Preferably, one or all of these operations are carried out automatically and autonomously from a cloud deployment appliance or cloud management platform.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 10 illustrates a further portion of the TOSCA document shown in FIG. 9;

DETAILED DESCRIPTION OF AN ILLUSTRATIVE EMBODIMENT

Figure 1:
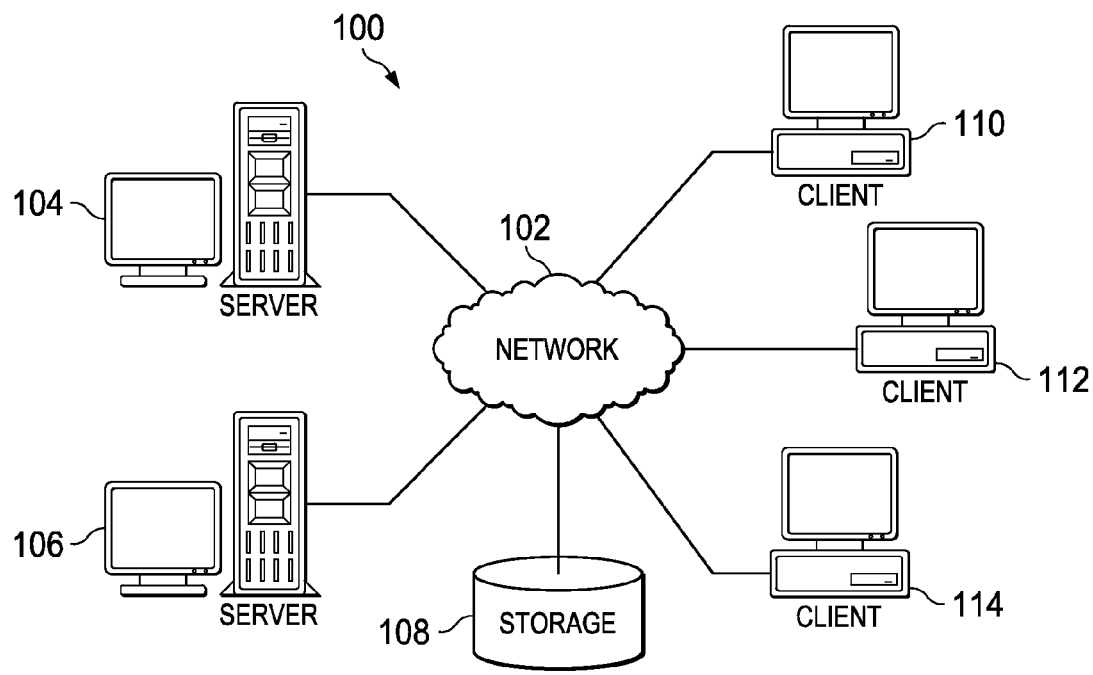
FIG. 1 depicts an exemplary block diagram of a distributed data processing environment in which exemplary aspects of the illustrative embodiments may be implemented.
Figure 2:
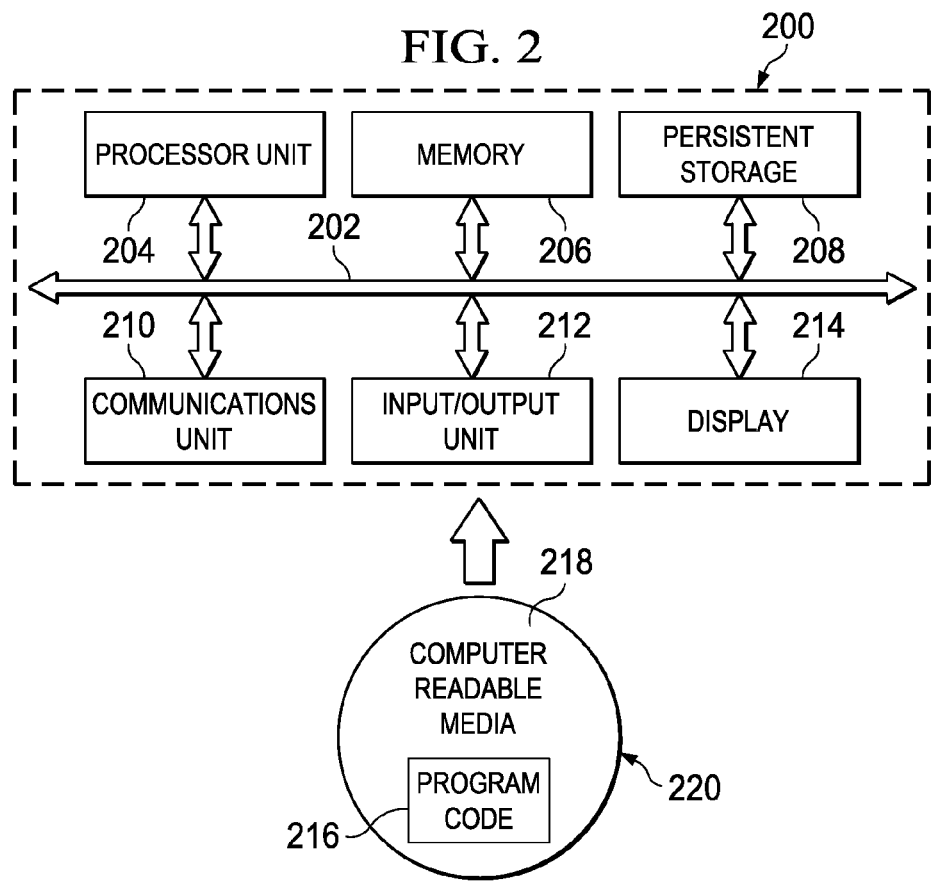
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
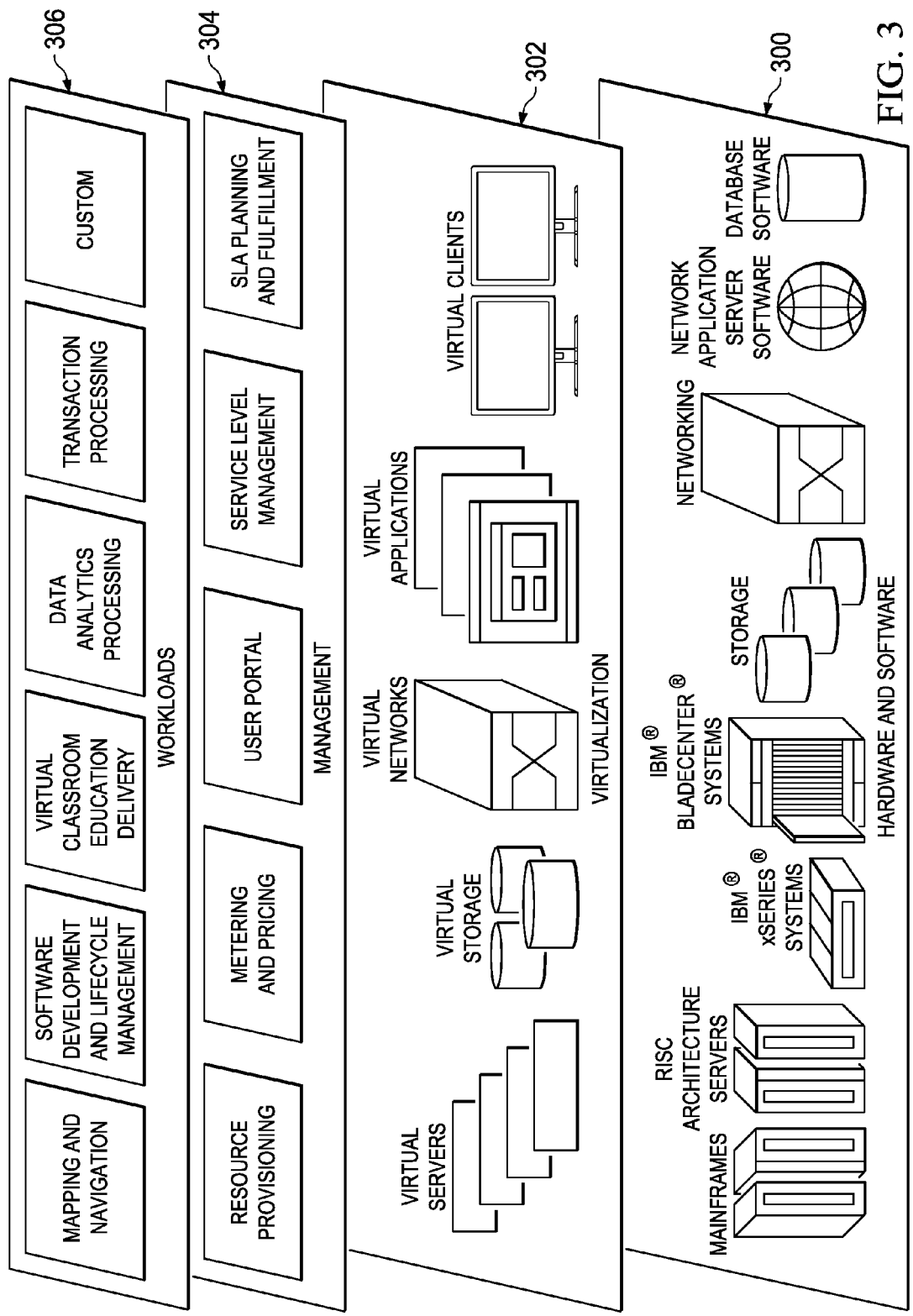
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Cloud Deployment Technologies

It is known to provide an appliance-based solution to facilitate rapid adoption and deployment of both Infrastructure and Platform as Service offerings. As described above, one such appliance is IBM Workload Deployer (IWD), and this appliance also may be used to manage a shared, multi-tenant environment, where isolation and security are of utmost importance. The secure nature of the physical appliance (sometimes referred to herein as a box) typically is provided by a self-disabling switch, which is triggered if the appliance cover is removed. This physical security enables the appliance to serve as a secure vault for credentials, which can be tied to virtual images throughout their entire lifecycle (in storage, being dispensed, running in the cloud, or being removed from the cloud). IBM Workload Deployer also contains a storage driver that streamlines the storage of image customizations. It also serves as a dedicated store for both pre-loaded and customized middleware virtual images and patterns. The appliance also includes advanced compression and storage techniques that enable a large number of these virtual images (each of which may be sizeable) to be stored.

In operation, the appliance can provision standard and customized middleware virtual images and patterns that can be securely deployed and managed within private or on-premise cloud computing environments. These virtual images can help organizations to develop, test, and deploy business applications easily and quickly, thus ending the manual, repetitive, and error prone processes that are often associated with creating these complex environments. Upon completion, resources are returned to the shared resource pool automatically for future use and are logged for internal charge-back purposes. The appliance also manages individual user and group access to resources, providing IT managers with the control needed to optimize efficiency at a fine-grain level.

Typically, the appliance includes hardware and firmware cryptographic support to encrypt all the data on hard disk. This data includes, without limitation, event log data. No users, including administrative users, can access any data on physical disk. In particular, the operating system (e.g., Linux) locks down the root account and does not provide a command shell, and the user does not have file system access. When an administrator performs a backup of the appliance, the backup image is encrypted to protect the confidentiality of the data. When restoring an encrypted image, a decryption key thus is needed to decrypt the backup image to enable the data to be restored to the appliance.

Figure 4:
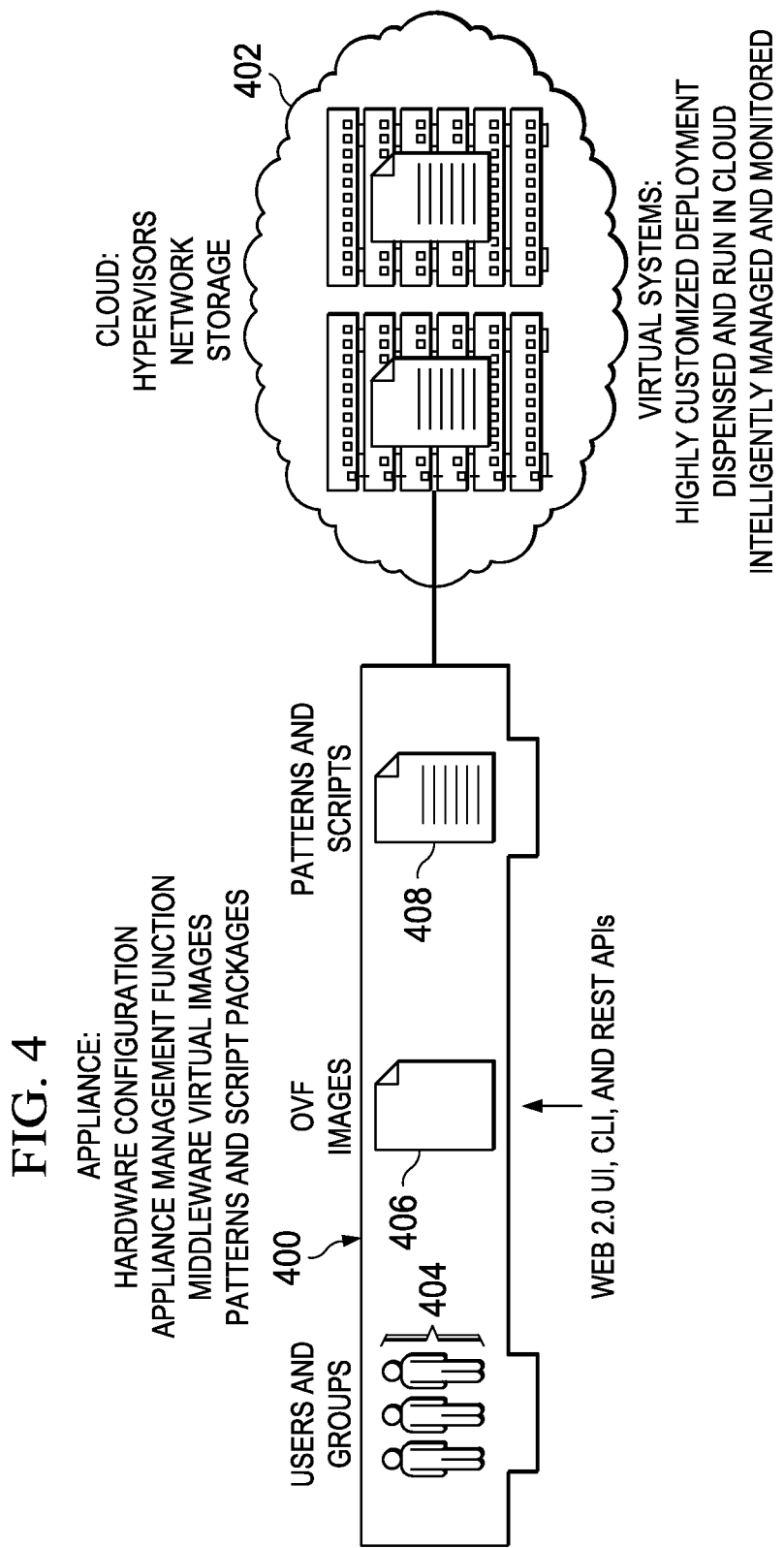
FIG. 4 illustrates an exemplary operating environment in which a network-based appliance may be used to facilitate deployment of one or more cloud-based offerings.

Referring to FIG. 4, a representative operating environment includes the physical appliance 400, which interfaces to the cloud 402. The appliance may be implemented using a data processing system such as described above with respect to FIG. 2. Preferably, the appliance 400 includes a Web 2.0-based user interface (UI), a command line interface (CLI), and REST-based application programming interfaces (APIs). The appliance provides a management function that enables the rapid deployment of cloud-based solutions. To that end, the appliance provides storage for (i) data 404 used to manage user and group access to resources, (ii) for pre-loaded and/or customizable middleware virtual images 406, and (iii) for configurable patterns and script packages 408. Patterns are logical descriptions of both the physical and virtual assets that comprise a particular solution. As will be described in more detail below, preferably patterns are structured according to the TOSCA specification. The management function and interfaces provide a template-based approach to construction that permits the rapid creation and modification of an otherwise complex set of hardware and software components. In particular, the use of patterns allows an organization to construct an individual element or integrated solution one time, and then to dispense the final product on demand. Typically, there are two types of patterns: virtual system patterns provide the most flexibility and customization options of the two types. It consists of an operating system and, potentially, additional software solutions, such as WebSphere® Application Server. Virtual application patterns are optimized and are constructed typically for the purpose of supporting a singular workload.

As also seen in FIG. 4, the on-premise or private cloud environment 402 on which the middleware application runs typically constitutes hypervisors, networking infrastructure, and storage devices that are allocated to the appliance. A representative environment may be implemented in the manner described above with respect to FIG. 3.

Figure 5:
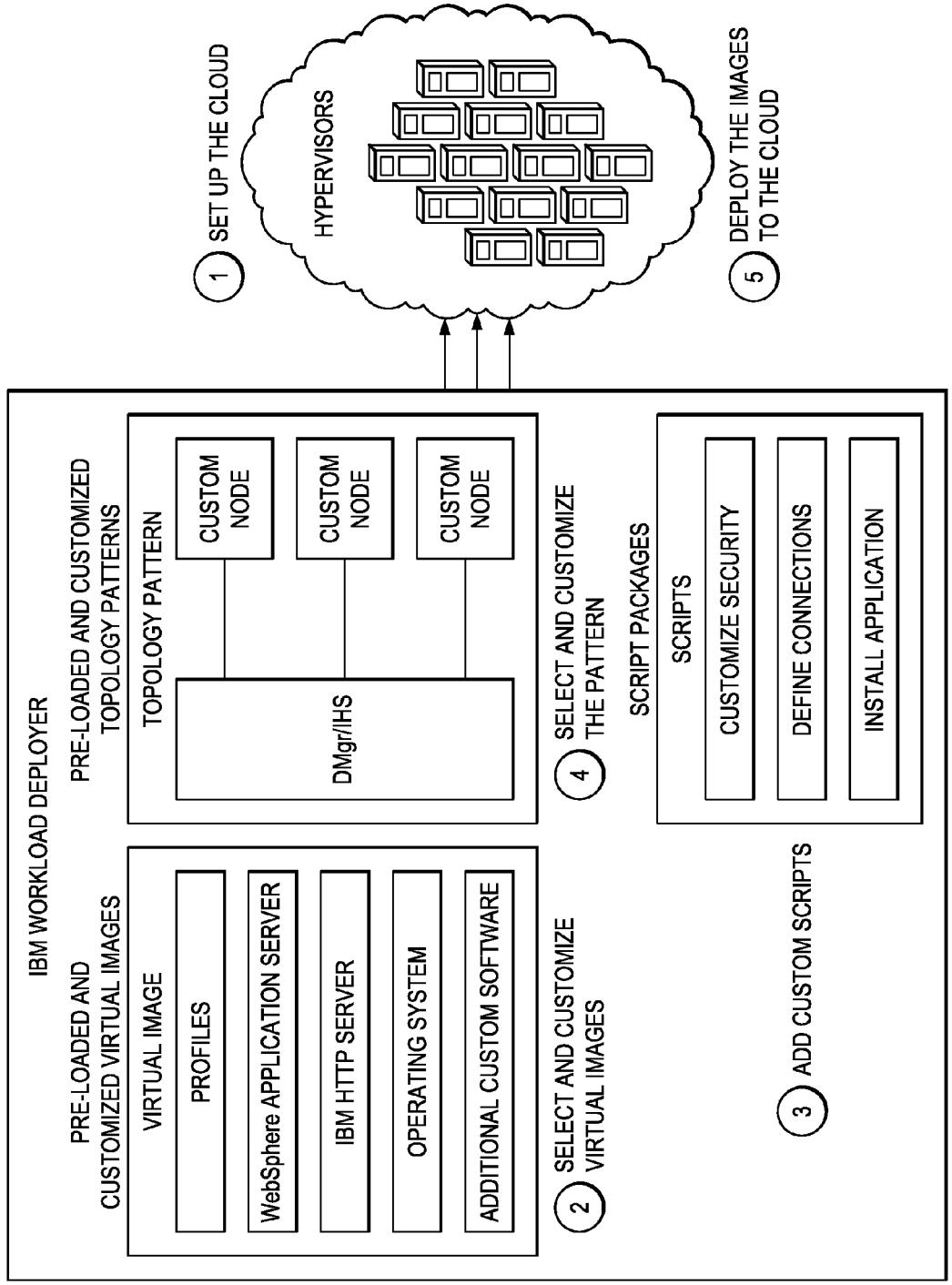
FIG. 5 illustrative representative functional components of the network-based appliance.

FIG. 5 illustrates how the appliance can be used to build a custom private cloud. At step 1, the hardware, hypervisors and networking for the cloud are identified. At step 2, the user selects and customizes the virtual images. At step 3, the user adds one or more script packages as needed to customize the deployed middleware environment. At step 4, pre-installed or customized patterns are used to describe the middleware topology to be deployed. Patterns can be built from virtual images, e.g. using a drag-and-drop interface. At step 5, the virtual systems are deployed to the cloud.

The references herein to IBM Workload Deployer are exemplary and should not be taken to limit the disclosed technique, which may be implemented on any appliance (or, more generally, machine) having the general characteristics and operating functionality that has been described. Specific references to IWD should be construed to include both the above-identified product, as well as other technologies that implement the functionality referenced above.

TOSCA

The Oasis Topology and Orchestration Specification for Cloud Applications (TOSCA) is a specification designed to enhance the portability of cloud applications and services. It enables the interoperable description of application and infrastructure cloud services, the relationships between parts of the service, and the operational behavior of these services (e.g., deploy, patch, shutdown), independent of the supplier creating the service and any particular cloud provider or hosting technology. Among other benefits, TOSCA enables portable deployment to any compliant cloud, and facilitates smooth migration of existing applications to the cloud. Using TOSCA, cloud applications can be modeled, shared, deployed and managed, seamlessly, amongst products and cloud platforms, from multiple vendors.

A TOSCA document is a descriptor that describes all application components to be deployed to the cloud and their interrelationships. In the descriptor, each application component typically is uniquely identified by an identifier composed of a name, version, architecture, as well as a vendor of the component. This identifier is useful as a search key with respect to a database of information; as will be described below, one such database is a database of known defects and/or vulnerabilities for that specific application component.

Figure 6:
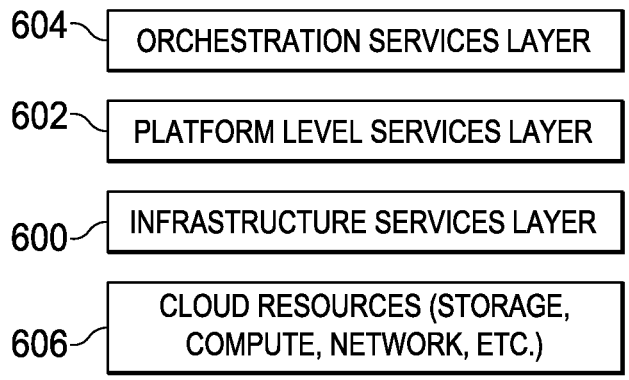
FIG. 6 illustrates a representative cloud management platform in which the techniques of this disclosure may be implemented.

FIG. 6 illustrates a cloud management platform that implements TOSCA-compliant solutions. In one embodiment, the cloud management platform is the IBM® SmartCloud® Orchestrator open cloud management platform, which leverages additional standards technologies such as OpenStack, and OSLC (Open Service for Lifecycle Collaboration). As illustrated in FIG. 6, a management platform of this type comprises three main functional layers: an infrastructure services layer 600, which is preferably based on OpenStack, for provisioning, configuring and managing storage, compute and network resources 606, a platform services layer 602, which includes virtual machine image lifecycle management capabilities and pattern services, wherein a "pattern" provides deployment and management instructions for the business service. A pattern preferably is an XML-based definition of an infrastructure configuration required to provision and managed the various resources (e.g., compute, networking, storage, OS, middleware, and the like) for a specific application (or application-type) workload. The orchestration services layer 604 provides a business process management solution. Preferably, TOSCA is supported in both the platform services layer 602 and the orchestration services layer 604. In this way, TOSCA standardizes pattern definitions so that the described workload is portable between any clouds that adhere to the TOSCA standard. The platform preferably also supports OSLC for continuous delivery across heterogeneous deployment environments. OSLC enables customers to develop and seamlessly deploy software components for change management, automation, monitoring, and the like.

Of course, the above-described cloud management environment is not intended to be limiting, as the techniques herein may be implemented in other (open, closed, or hybrid) environments, and/or using other deployment technologies (whether open or proprietary, or mixed).

Remediation of Known Defects and Vulnerabilities in Cloud Application Packages

With the above as background, the subject matter of this disclosure is now described. Without limitation, the subject matter may be implemented within or in association with a cloud deployment appliance (FIG. 4) or platform (FIG. 6) as has been described, or using any other type of deployment systems, products, devices, programs or processes.

As used herein, a typical cloud application package comprises a set of components. A particular application component may have associated therewith a "defect" and/or "vulnerability." A component "defect" (or "bug") is an error, flaw, failure or that causes the component to produce an incorrect or unexpected result, or to behave in unintended ways. A defect may be systemic, or based on some condition (e.g. a data corruption). The defect may be latent or patent. "Vulnerability" (sometimes referred to as a "security vulnerability") typically refers to some weakness associated with the component that might be exploited by one or more threats and that can to reduce the component's operational efficiency or other value. The techniques herein assume the existence of a database (or other information source) of known defects and/or vulnerabilities for each of the one or more application components that comprise a cloud application package. This database may be part of the management solution, or the solution may access such a database (or other data source) maintained by some other entity. Preferably, the database comprises information about known software components. Each software component is assumed to have zero or more known "problems," wherein a "problem" preferably is characterized by a "severity" and a "complexity." While the notion of "severity" applies to both defects and vulnerabilities, complexity is more pertinent to vulnerabilities. Certain vulnerabilities are easier to exploit than others, and complexity is an important factor to consider in determining the scope of a particular threat. Thus, for example, a high severity vulnerability that is very complex to exploit might require less immediate attention than a lower severity vulnerability that can be exploited more easily. A given problem (whether a defect or a vulnerability) may thus have some defined or ascertainable trade-off between severity and complexity. A particular problem identified in the database is assumed to have zero or more associated fixes. As will be described in more detail below, typically fixes may be available in various types, such as full new versions, as updates that can be slipstreamed over an old installable, as patches, or the like. More generally, a fix may be considered to be a type of remediation policy (or just a policy) by which some correction action is taken with respect to or in association with the component. The action may be one of: an update, a replacement, a patch, the providing of a service pack, combinations thereof, and the like.

The techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

Preferably, an enterprise has a catalog of cloud applications packages that are clean (i.e., free) of any known vulnerability. In one embodiment, the method described herein is initiated in response to a discovery of a new defect or vulnerability in a cloud application in the catalog, although this is not necessarily a limitation. Once the defect or vulnerability is addressed by the technique described, the old version of the package is replaced with the new (corrected) version. In the event a remediation policy to address the defect or vulnerability is not available, the cloud application package may be temporarily removed from the catalog, e.g. until a fix is developed or otherwise available.

Figure 7:
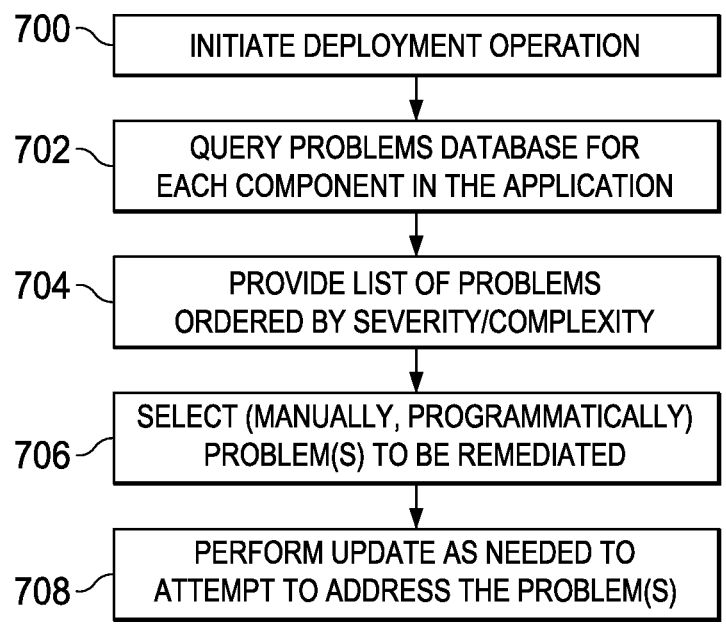
FIG. 7 is a process flow describing the basic remediation technique of this disclosure.

Referring to FIG. 7, and according to an alternative embodiment, a deployment operation for a cloud application package is initiated, typically in response to a request. This is step 700, and the operation may be initiated manually, automatically or programmatically. At step 702, and after the package is parsed or otherwise processed as necessary to identify its components, the database is queried (e.g., using a unique identifier) to identify the known problems for one or more (or all) of the components of the cloud application package. Using information in the database, each problem may be ordered/presented by its severity and/or complexity, or by some factor that takes into consideration both severity and complexity. This is step 704. The manner by which the problem information is presented to the user depends on the implementation. A convenient presentment method is using a web-based solution wherein the results retrieved from the database lookup are provided as one or more web pages. The inquiry into the database preferably also returns an indication whether a fix exists for the problem. Based on the information provided, and at step 706, the administrator then selects which problem or problems he or she desires to remediate, preferably prior to deployment (or upon deployment) of the cloud application package. The operation at step 706 serves to characterize the identified component problem and, as noted, this characterization may be based on severity, complexity, some trade-off or combination thereof, or some other factor (e.g., cost). Depending on the nature of the problem, the fix may need to be implemented in advance of any deployment, during deployment, or following deployment of the original cloud application package installable(s). To this end, the system (e.g., under the control of the administrator) then executes an update process. This is step 708. The result is a new or updated (corrected) version of the cloud application package, which version is then deployed (or having been deployed, is then instantiated for execution). This completes the basic processing.

While the above-described description contemplates cloud administrator involvement in the problem selection/remediation, this is not a requirement. The process may also be automated for all cloud application packages stored in a repository, e.g., based on administrator-specified thresholds for severity and/or complexity. In this embodiment, which is a preferred approach, a given cloud application package being deployed is examined (e.g., using its TOSCA identifier) against the database; if the package includes any component having a known problem whose severity and/or complexity values exceed a configurable threshold, the cloud application package is automatically updated using one or more fixes. The resulting new version of the cloud application package is then deployed and instantiated in the cloud. All of these operations may occur via an automated process.

Figures 8, 9:
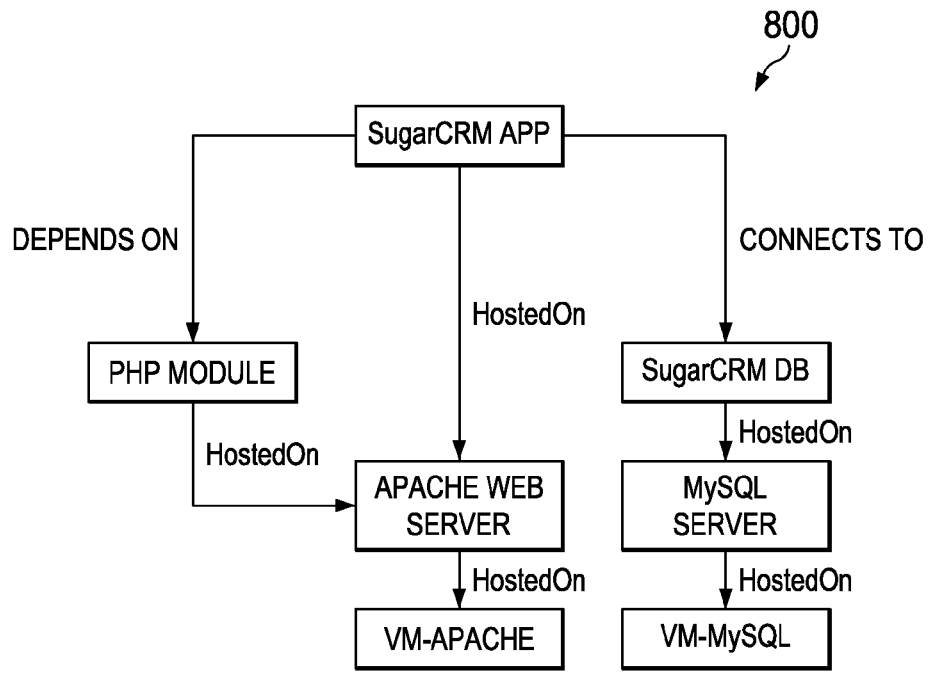
FIG. 8 illustrates a representative cloud application package.
FIG. 9 illustrates a portion of an XML-based TOSCA deployment description document.

Referring now to FIG. 8, the techniques herein are described within the context of an example, but non-limiting scenario. FIG. 8 illustrates a cloud application package 800 for a Customer Relationship Management (CRM) application. The techniques herein are not limited to any particular cloud application and/or components. In this example scenario, the cloud application comprises a set of components as illustrated, with the various interrelationships and dependencies noted. The topology of such an application can be represented in various ways, for example, preferably using the TOSCA specification notation (or some other structured data approach). Thus, for example, FIG. 9 illustrates a portion of an XML TOSCA deployment description document that includes various tag sets including NodeTemplates that represent components within the application's overall topology. Each NodeTemplate points to its type (NodeType) that has a concrete implementation (NodeTypeImplementation), which in turn finally points to a software installable to be used for deploying the respective component of the application. FIG. 10 illustrates the representative XML for the Apache Web-Server component in this example. As can be seen, the ArtifactReference element points to the concrete installable to be used, which is contained in the overall application package in a "files" sub-directory. The overall application package typically is provisioned as a TOSCA Cloud Service Archive (CSAR). Each NodeType preferably also provides manageability operations (e.g., "install") to be invoked by an orchestration engine to deploy an instance of the component at runtime. Those operations are implemented by ImplementationArtifacts in the corresponding NodeTypeImplementation that finally points to the actual script (or other executable(s)) that implement the operation. Preferably, each component has its own unique identifier (e.g., SoftwareID, in this example). There are several possible formats for the software identifier. For example, the National Vulnerability Database uses identifiers based on the CPE standard.

Figures 11, 12:
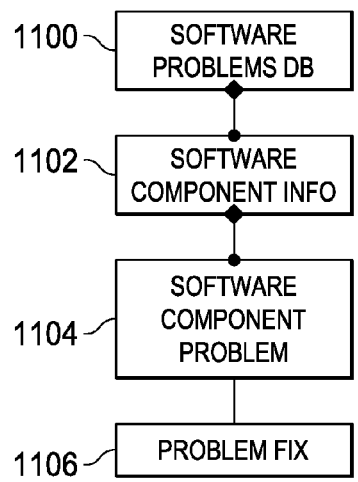
FIG. 11 illustrates a high level representation of a problems database for use in the remediation technique of this disclosure.
FIG. 12 is a representative known problem list for the cloud application package shown in FIG. 8.

According to this disclosure, the database preferably is organized as shown in FIG. 11. It includes a data set of software problems 1100, a data set of software component information 1102, a data set of software component problems 1104, and a data set of problem fixes 1106. The data set(s) may be organized hierarchically or in any conveniently-accessible manner using known database retrieval systems. As noted above in the discussion of the basic process flow (FIG. 7), preferably the system queries the database for any known problems about each component, preferably using the component descriptor or identifier (e.g., the TOSCA identifier) as the query key. The result is a list of one zero or more known problems. This query operation may be carried out for the package as a whole (with all of the results returned at once), or iteratively for each individual component (or some of them), with individual results returned for each component.

The nature and format of the problem information presentation is not limited to any particular approach.

FIG. 12 is a representative known problem list for the CRM cloud application shown in FIG. 9. According to this disclosure and as described above, the list of problems is presented to the user, who can then select one or more (or all) of the problem(s) he or she desires to remediate. For each selected problem, preferably the information also identifies a fix, such as a patch, a newer version of the component, or the like. Using the information provided, the user downloads or otherwise obtains the required software and remediates the identified problem(s) selected for remediation.

There may be various fix types for the cloud application package that has been found to include a defect and/or vulnerability. In one use case, a full new version is installed. In another use case, an update that can be slip-streamed over an old installable file (or files) is implemented. In still another use case, a patch is installed, preferably at deployment time, after the primary component is installed. Each of the use cases is now described in more detail.

Figure 13:
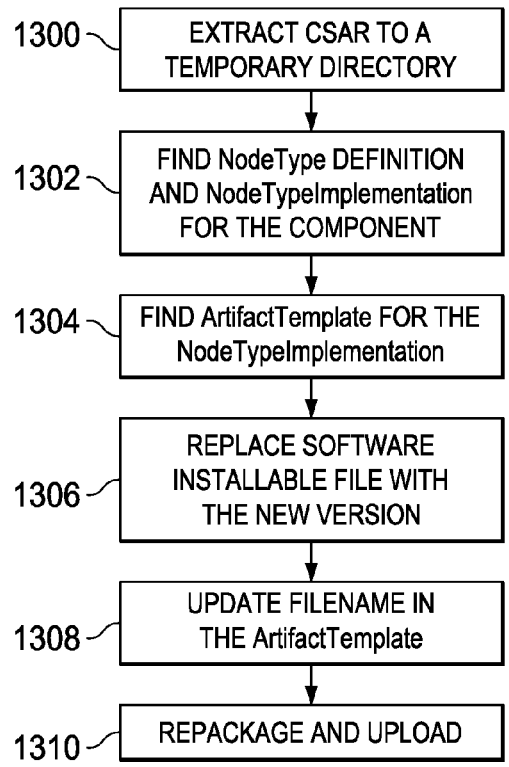
FIG. 13 is a process flow illustrating a first type of fix operation that may be implemented upon discovering a problem with the cloud application package.

In the first fix type use case, shown in FIG. 13, the original cloud application package is updated by replacing the installable inside the package and then updating package metadata to point to the new installable. In the following description, TOSCA is used to describe the cloud application and its packaging. The routine begins at step 1300 by extracting the Cloud Service Archive (CSAR) to a temporary directory. At step 1302, the routine finds the NodeType definition and NodeTypeImplementation for the component to be updated (e.g., Apache WebServer). From the NodeTypeImplementation, the routine continues at step 1304 by navigating to the ArtifactTemplate pointing to the installable in the CSAR, which is now on the filesystem in a temporary directory. At step 1306, the routine replaces the software installable with the new version. If necessary, at step 1308 the routine updates the installable file name in the ArtifactTemplate definition. At step 1310, the routine re-packages the CSAR and uploads it, e.g., to a definitive software library, as a new version. This completes the processing.

Figure 14:
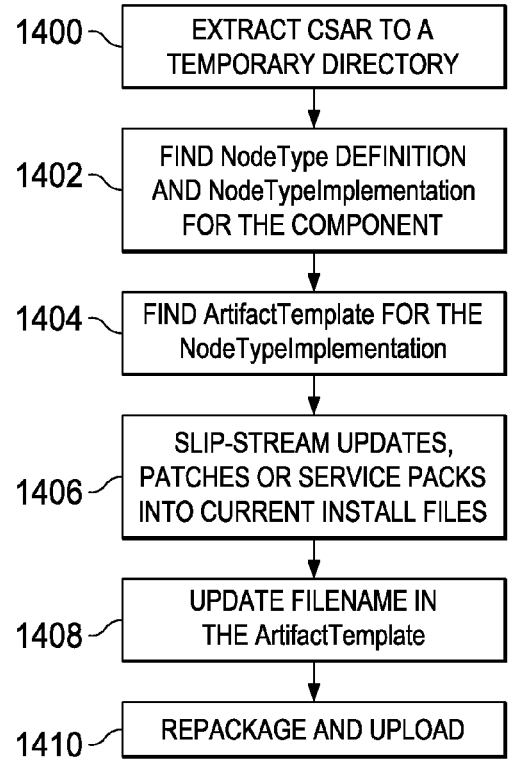
FIG. 14 is a process flow illustrating a second type of fix operation that may be implemented upon discovering a problem with the cloud application package.

In a second fix type use case, which is shown in FIG. 14, the original cloud application package is updated by slip-streaming updates, patches or service packs into the current installation files (installables) inside the package and updating package metadata to point to the new installable. The routine begins at step 1400 by extracting the CSAR to a temporary directory. At step 1402, the routine finds the NodeType definition and NodeTypeImplementation for the component to be updated (e.g., Apache WebServer). At step 1404, and from the NodeTypeImplementation, the routine navigates to the ArtifactTemplate pointing to the installable in the CSAR (now on the filesystem in the temporary directory). At step 1406, the updates, patches or service packs are slip-streamed into the current installation files. If necessary, at step 1408 the routine updates the installable file name in the ArtifactTemplate definition. At step 1410, the routine re-packages the CSAR and uploads it, e.g., to the definitive software library, as a new version. This completes the processing.

Figure 15:
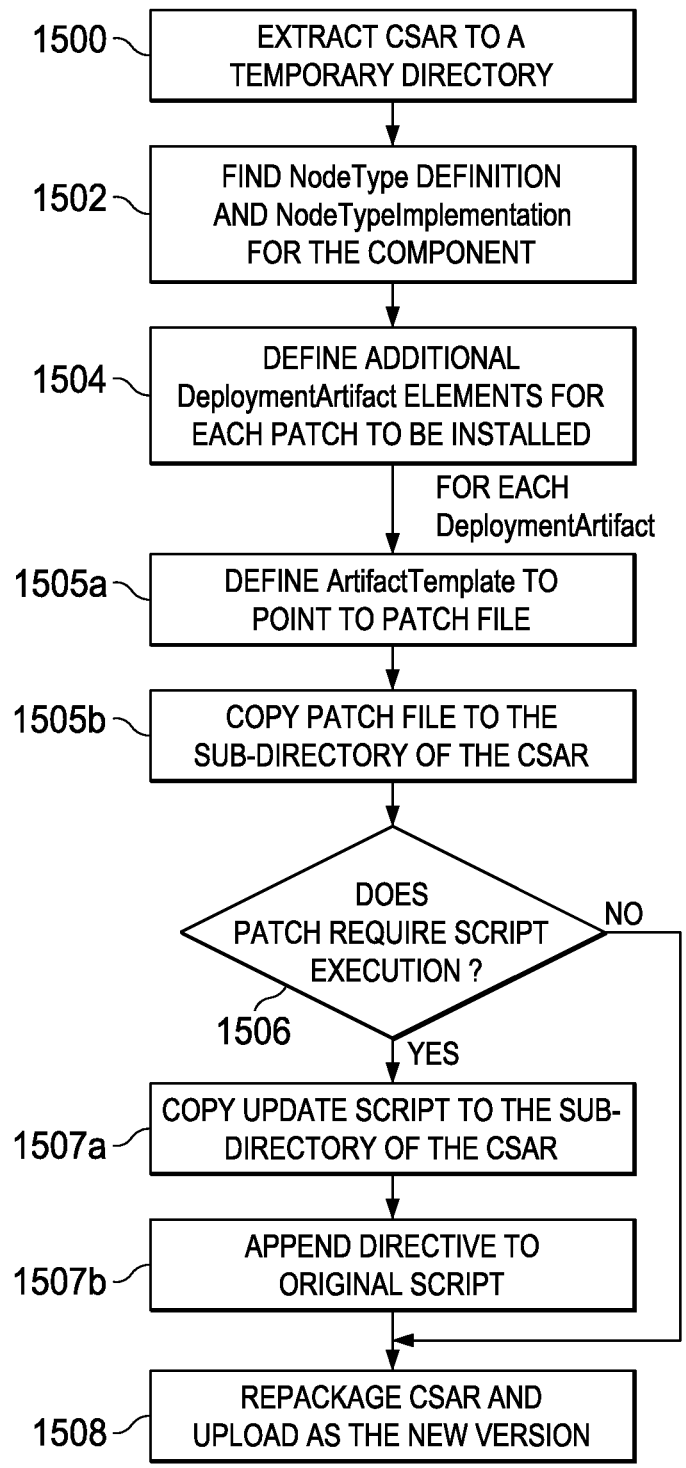
FIG. 15 is a process flow illustrating a third type of fix operation that may be implemented upon discovering a problem with the cloud application package.

In the third fix type use case, which is shown in FIG. 15, the original cloud application package is extended with additional installable files (the patches) and optionally with scripts to install the patches. The routine begins at step 1500 by once again extracting the Cloud Service Archive (CSAR) to a temporary directory. At step 1502, the routine finds the NodeType definition and NodeTypeImplementation for the component to be updated (e.g., Apache WebServer). From the NodeTypeImplementation, the routine continues at step 1504 by defining additional DeploymentArtifact elements for each patch to be installed. Then, the following sub-steps are executed: at step 1505a, and for each DeploymentArtifact, a corresponding ArtifactTemplate is defined to point to the actual patch file in the CSAR; at step 1505b, the respective patch file is copied to the proper sub-directory of the extracted CSAR. The routine then continues at step 1506 to determine if the patch requires execution of a script to apply the patch (as opposed to, for example, extracting the archive to a certain location). If the outcome of the text is positive, the routine continues to perform the following sub-steps: at step 1507a, the (update) script is copied to the sub-directory of the extracted CSAR, which sub-directory contains the 'normal' install/configure scripts of the updated component; at step 1507b, the original script is appended with a directive to execute the update script at the end of the normal install procedure. Similar sub-steps are repeated if additional update scripts are required. The routine then continues at steps 1508 to re-package the CSAR and upload it, e.g., to the definitive software library, as a new version. This completes the processing.

The particular fix may be implemented using tools supplied by the cloud deployment application or platform, or using other mechanisms.

The above-described subject matter provides many advantages. It enables the cloud application to be deployed safely and with assurances that the various components therein are proactively updated or patched with the very latest available fixes. The approach enables monitoring of cloud application packages (or, more generally, image templates) for vulnerabilities and providing the means by which such packages may be kept up-to-date, preferably based on user-selectable policy. The approach enables known vulnerabilities or defects to be removed from cloud application packages proactively and in an automated manner prior to or upon deployment. With this approach, administrators can be more confident that the cloud application they are about to deploy does not contain known vulnerabilities or other defects or problems for which a patch already exists. The administrator can also use the database to better understand the relevance of the vulnerabilities in the cloud application packages and decide whether an update is required.

As described, the approach herein may be implemented manually or in an automated manner, in whole or in part.

While a preferred operating environment and use case (a cloud deployment appliance or platform) has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The references herein to the deployment description being a TOSCA document are not meant to be limiting, as the description may comprise some other type or format, such as a template, a pattern, a package, or the like.

In the above description, a preferred approach is to apply the remediation policy to a cloud application package (typically one of a set of cloud application packages in a catalog of such application packages) in response to discovery of a new problem (a defect or vulnerability). This is not a requirement, however, as the technique may be implemented in other contexts, e.g., when a cloud application package is being deployed for the first time.

Having described our invention, what we now claim is as follows.

The invention claimed is:

1. Apparatus, comprising:
 a processor;
 computer memory holding computer program instructions executed by the processor to apply a remediation policy to a cloud application package having a set of components, the cloud application package being associated with a catalog of cloud application packages, the computer program instructions comprising:
  program code, operative in response to discovery of a new defect or vulnerability, to compare information from a deployment description against a data set of known problems associated with the one or more of the components, the deployment description representing the set of components and their interrelationships;
  program code, operative to identify, for each of the one or more components, one or more known problems that satisfy a given criteria;
  program code, operative to apply, with respect to at least one of the components for which at least one known problem satisfying the given criteria has been identified, the remediation policy to attempt to rectify the known problem; and
  program code, operative after applying the remediation policy, to replace an old version of the cloud application package in the catalog of cloud application packages with a new version.

2. The apparatus as described in claim 1 wherein the computer program instructions further include:
 program code to determine a current availability of the replacement policy; and
 program code to remove the cloud application package from the catalog of cloud application packages when it is determined that the replacement policy is not currently available.

3. The apparatus as described in claim 1, wherein the given criteria is one of: a complexity criteria, a severity criteria, and a combination of the complexity and severity criteria.

4. The apparatus as described in claim 1 wherein the computer program instructions further include:
 program code to provide information identifying a listing of known problems ordered according to the given criteria; and
 program code to receive data identifying a selection of the one known problems to which the remediation policy is to be applied.

5. The apparatus as described in claim 1 wherein the remediation policy is selected from one of: an update, a replacement, a patch, and an additional installable.

6. The apparatus as described in claim 1 wherein the deployment description is a TOSCA (Topology and Orchestration Specification for Cloud Applications)-compliant document.

7. The apparatus as described in claim 1 wherein the operations are carried out automatically and autonomously.

8. A computer program product in a non-transitory computer readable medium for use in a data processing system, the computer program product holding computer program instructions executed by the data processing system to apply a remediation policy to a cloud application package having a set of components, the cloud application package being associated with a catalog of cloud application packages, the computer program instructions comprising:

program code, operative in response to discovery of a new defect or vulnerability, to compare information from a deployment description against a data set of known problems associated with the one or more of the components, the deployment description representing the set of components and their interrelationships;

program code, operative to identify, for each of the one or more components, one or more known problems that satisfy a given criteria;

program code, operative to apply, with respect to at least one of the components for which at least one known problem satisfying the given criteria has been identified, the remediation policy to attempt to rectify the known problem; and program code, operative after applying the remediation policy, to replace an old version of the cloud application package in the catalog of cloud application packages with a new version.

9. The computer program product as described in claim 8 wherein the computer program instructions further include:

program code to determine a current availability of the replacement policy; and program code to remove the cloud application package from the catalog of cloud application packages when it is determined that the replacement policy is not currently available.

10. The computer program product as described in claim 8, wherein the given criteria is one of: a complexity criteria, a severity criteria, and a combination of the complexity and severity criteria.

11. The computer program product as described in claim 8 wherein the computer program instructions further include:

program code to provide information identifying a listing of known problems ordered according to the given criteria; and program code to receive data identifying a selection of the one known problems to which the remediation policy is to be applied.

12. The computer program product as described in claim 8 wherein the remediation policy is selected from one of: an update, a replacement, a patch, and an additional installable.

13. The computer program product as described in claim 8 wherein the deployment description is a TOSCA (Topology and Orchestration Specification for Cloud Applications)-compliant document.

\* \* \* \* \*